C. J. MACKEREY.
FLUID CONTROLLER.
APPLICATION FILED JUNE 5, 1909.
934,001.
Patented Sept. 14, 1909.
2 SHEETS—SHEET 1.
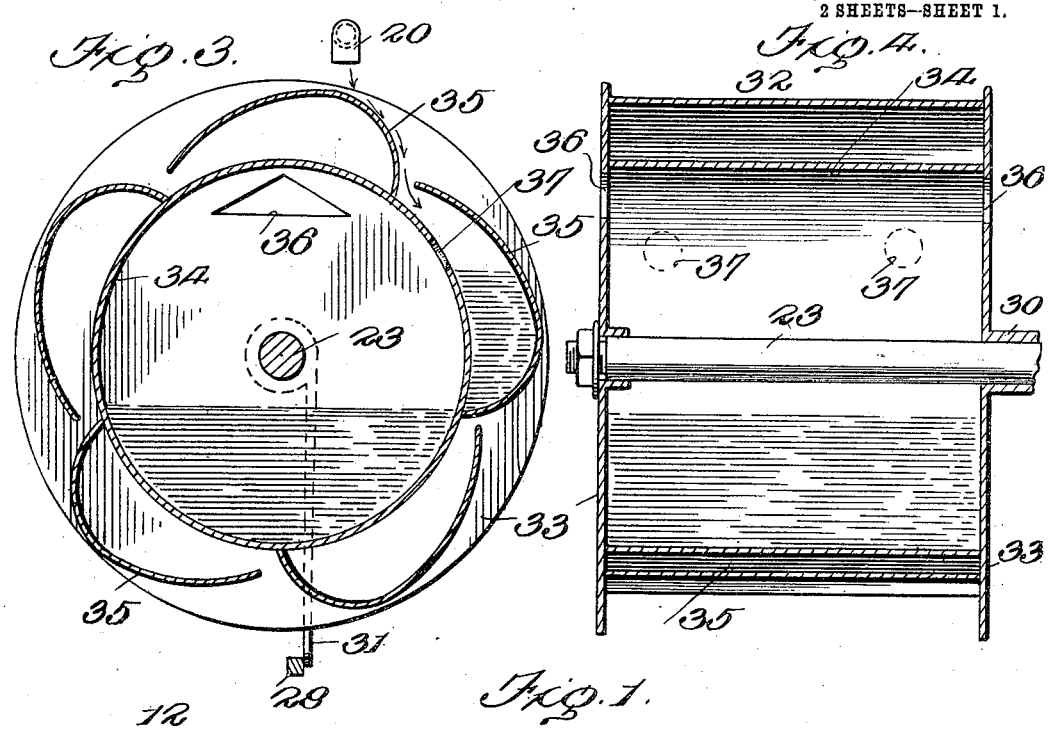
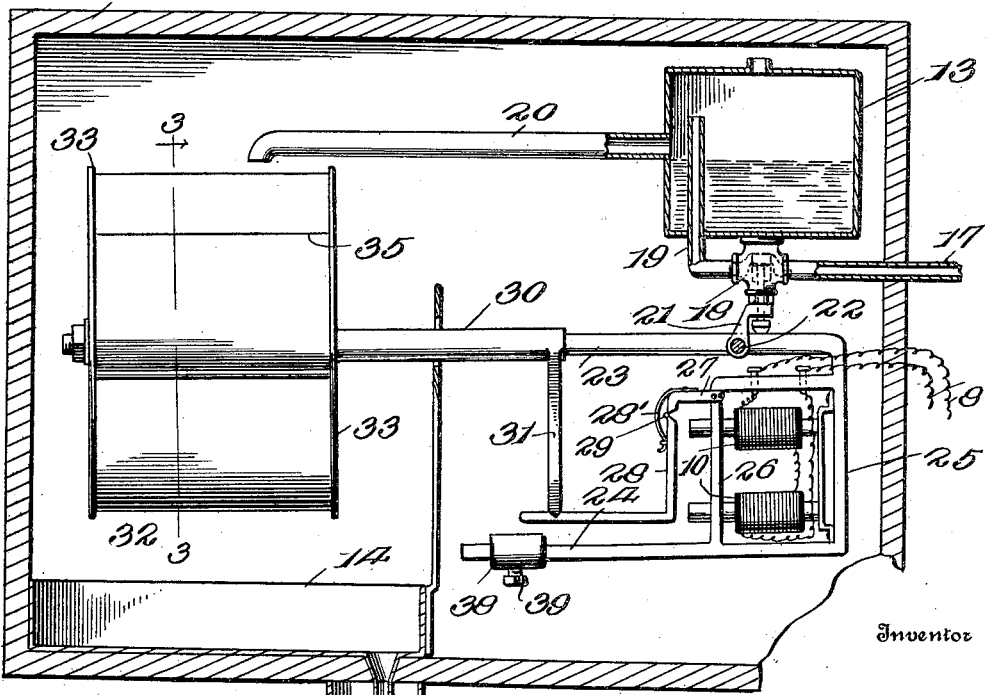
Witnesses
Inventor
C. J. Mackerey
By Dudley, Brown & Phelps
Attorney

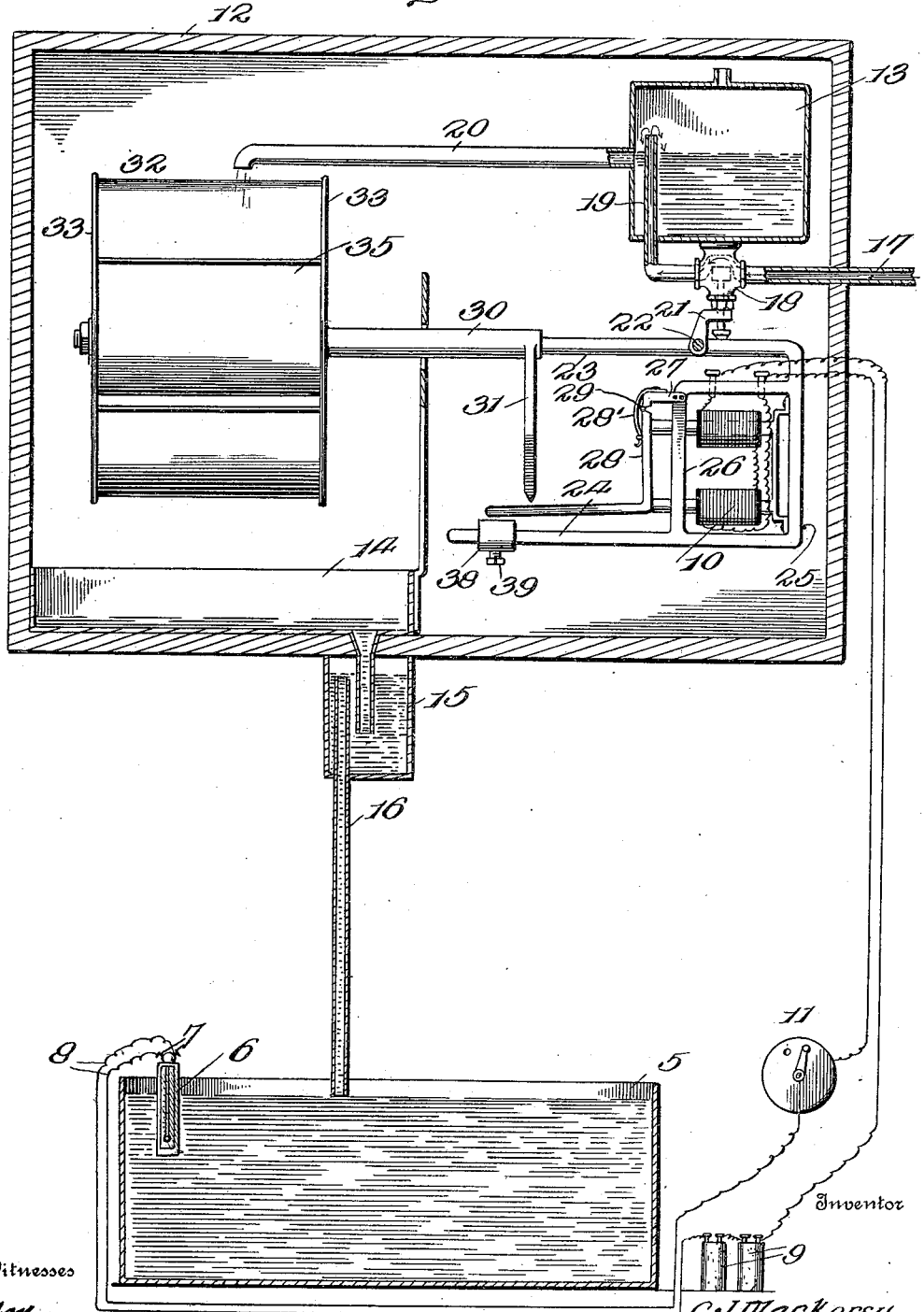

UNITED STATES PATENT OFFICE.

CHARLES JOSEPH MACKEREY, OF PHILADELPHIA, PENNSYLVANIA.

FLUID-CONTROLLER.

934,001.  Specification of Letters Patent.  Patented Sept. 14, 1909.

Application filed June 5, 1909. Serial No. 500,425.

*To all whom it may concern:*

Be it known that I, CHARLES JOSEPH MACKEREY, a citizen of the United States, residing at Philadelphia, in the county of Philadelphia and State of Pennsylvania, have invented certain new and useful Improvements in Fluid-Controllers, of which the following is a specification.

My invention relates to certain new and useful improvements in mechanism adapted to control the supply of water or other liquid, and the object of my invention is to produce a device of this character which is simple in construction, efficient and positive in operation and not likely to get out of order.

My invention is adapted to control the flow of liquid for any desired purpose, and in the accompanying drawings and following specification I have shown the invention for the sake of illustration as adapted for use as a means for regulating the temperature of water in a tank or other container, by supplying the said tank or container with cold water when ever the temperature of the water in the tank or container becomes too high and cutting of said supply when reduced to the desired temperature.

With the foregoing and other objects in view my invention consists in certain constructions, combinations and arrangements of parts one preferred form of which will be first described in connection with the accompanying drawings and then the invention particularly pointed out in the appended claims.

Referring to the drawings wherein the same part is designated by the same reference numeral wherever it occurs, Figure 1 is a view partly in section and partly in elevation showing one embodiment of my invention; Fig. 2 is a similar view showing the parts in the position they occupy while supplying liquid; Fig. 3 is an enlarged cross section of the controller drum taken on line 3,3 of Fig. 1 looking in the direction of arrows, and Fig. 4 is a central longitudinal section of Fig. 3.

In the embodiment of my invention illustrated 5 designates a tank adapted to receive a supply of hot water from any desired source and the temperature of which is desired to keep below a certain point by supplying cool water thereto as soon as the temperature of the water in the tank has risen to a certain temperature. 6 designates a thermometer carrying a pair of contacts 7 which are adapted to be closed by the mercury in the thermometer when the mercury has risen to a certain predetermined degree. Said thermometer may be of any ordinary or desired type.

8 designates wires which connect the contacts 7 of the thermometer with the battery 9, and to the magnets 10, said connection being such that the magnets will be energized when the circuit is closed by the mercury through the points 7.

11 designates a switch for opening the circuit when desired to throw the device out of operation.

12 designates a container which is preferably provided in its upper portion at one end with a small tank 13 and at the bottom of the container at its lower end with a pan or tank 14.

15 designates a trap connected to the bottom of the tank 14, and 16 is a pipe connecting the trap with the tank 5.

From the foregoing construction it will be seen that the water delivered to the tank 14 will pass through the trap 15 down the pipe 16 and into the tank 5, the trap operating to prevent steam from the water in the tank 5 from passing up the pipe 16 and into the container 12.

17 is a water supply pipe which extends through the casing 12 and within the casing it is provided with a cock 18 of any ordinary or desired construction, and 19 is the delivery head of the cock which extends into the bottom of the tank 13.

20 is a delivery pipe extending from the tank 13, preferably from about the middle portion of the tank. By the construction just described the force of water, due to the water pressure, is done away with and the water will gently flow through the pipe 20.

21 is a bracket extending downwardly from the cock 18, and pivoted on the pivot 22 in said bracket is a J-shaped arm comprising the long arm 23, the short arm 24 and a connecting portion 25. The long arm 23 is connected adjacent to the pivot 22 to the stem of the cock 18, so that when the outer end of the arm 23 moves up the cock will be open, while when it moves down to the position shown in Fig. 2 the cock will be closed.

26 is a frame mounted within the arm 24 and the portion 25 and supporting the pair of electromagnets 10 before referred to.

27 is a bracket arm extending out from the arm 26 and 28 is an L-shaped piece pivoted at 29 to the bracket arm 27, which piece forms the armature of the electromagnets 10 and a catch to be hereinafter described.

28' is a spring which is adapted to hold the armature 28 away from the magnets as long as the magnets are deënergized.

The arm 23 is formed cylindrical and 30 is a sleeve rotatably mounted upon the arm 23. This sleeve is provided at its end with a projecting arm 31 of such a length that the end of the arm will contact with the outwardly extending portion 28 of the armature when the same is in the position shown in Fig. 1, but will pass over the outwardly extending projecting portion of the armature when the same is attracted by the electromagnets as shown in Fig. 2, whereby the outwardly projecting portion of the armature forms a catch.

Fast on the sleeve 30 is the controller drum 32, said drum being formed with two heads 33—33 and a cylindrical portion 34 extending between the heads. Between the heads 33—33 are a series of flights or buckets 35 extending out from the periphery of the cylinder. These flights are adapted to catch water running onto the top of the drum and cause the same to rotate.

36 are a pair of openings which are shown as triangular in shape, one made in each of the heads 33 adjacent the inner side of the cylinder 34, the openings being so arranged in the head that when the arm 31 is in contact with the catch portion of the armature 28 said openings will be at the top of the drum, as best shown in Fig. 3.

37 are openings through the cylinder 34, said openings being located under the flight which is in position to receive water when the drum is held in the position shown in Fig. 3, said openings being preferably located under the outer portion of said flight, as shown in said figure, so that with the drum held in the position shown in Fig. 3 water will flow from the pipe 20 and fill up the pocket formed by the flight and then flow through the openings 37 and into the interior of the cylinder 34.

38 is a counter weight adjustably mounted upon the arm 24 and provided with set screw 39, whereby the counter-weight may be secured in adjusted position. This counter-weight is so adjusted on the arm that when the interior of the drum is not partly filled with water the arm will stand in the position shown in Fig. 2, when the valve 18 will be open.

In the operation of my device let it be supposed that the parts are in the position shown in Fig. 1 with the valve closed. When in this position the drum will be filled with water to about the height indicated in Fig. 3. When the water in the tank 5 reaches a predetermined temperature the mercury in the thermometer 6 will close the contact 7 and energize the magnets 10. This will cause the catch portion of the armature 28 to release the arm 31. Water contained in the flight below the level of the openings 37 will cause the controller drum to commence to rotate, and this rotation will be sufficient to cause sufficient water in the interior of the drum to flow out through the openings 36 to cause the drum to move up into the position shown in Fig. 2, opening the valve 18. Water will now flow into the tank 13 and thence through the pipe 20 onto the controller drum, causing the same to rotate continuously and emptying substantially all the water from said drum. The rotation of the drum will continue and the water will flow over the drum into the pan 14 and thence to the tank 5 until the temperature of the water in the tank 5 has fallen sufficiently to break the electric circuit established through the contacts 7. As soon as these contacts are broken the catch portion of the armature 28 will move into the path of the arm 31 and stop the drum in the position shown in Fig. 3. As the interior drum now contains substantially no water the valve 18 will not be closed until sufficient water has flowed through the openings 37 into the interior of the drum to cause the drum to move back in the position shown in Fig. 1, which will cause the closing of the valve, and the device will be in condition for again operating when ever the electric circuit through the magnets shall be closed.

While I have shown and described the particular mechanism for controlling the release of the drum and the stopping of the same, and have also shown my device in connection with a temperature regulator for water, I desire to have it understood that my invention is not limited to either the stopping and releasing means shown nor to the application of the invention which is shown, as my invention may be controlled by any other means as will be obvious, and also may be used for any other purposes than that herein shown and described.

I realize that considerable variation is possible in the details of construction and arrangement of parts without departing from the spirit of my invention, and I therefore do not intend to limit myself to the specific form shown and described.

What I claim as new and desire to secure by Letters Patent is—

1. A rotatable drum composed of a pair of heads having a discharge opening through one of said heads, said opening being located on one side of the center thereof, a cylinder connecting said heads together, flights carried on the exterior of the cylinder, said cylinder being provided with an opening located beneath one of said flights.

2. A rotatable drum composed of a pair of heads having a discharge opening through one of said heads, said opening being located on one side of the center thereof, a cylinder connecting said heads together, flights carried on the exterior of the cylinder, said cylinder being provided with an opening located beneath one of said flights, means for rotatably mounting said drum, means for supplying fluid to said drum so located as to cause the drum to rotate, and means for releasably holding said drum in position with the openings in the heads of the drum up and with the flight under which the openings through the cylinder are located in position to receive water from the fluid supplying means.

3. A rotatable drum composed of a pair of heads having a discharge opening through one of said heads, said opening being located on one side of the center thereof, a cylinder connecting said heads together, flights carried on the exterior of the cylinder, said cylinder being provided with an opening located beneath one of said flights, an arm on which said drum is rotatably mounted, a valve connected to the arm and adapted to be opened and closed by the movement thereof, a pipe adapted to supply fluid from the valve to the drum, said pipe being so located as to cause the drum to be rotated by said fluid, and a latching means adapted to releasably hold the drum in position with the openings in the heads of the drum up and the flight beneath which the openings in the cylinder are located in such position as to receive liquid from the pipe.

4. A rotatable drum composed of a pair of heads having a discharge opening through one of said heads, said opening being located on one side of the center thereof, a cylinder connecting said heads together, flights carried on the exterior of the cylinder, said cylinder being provided with an opening located beneath one of said flights, an arm pivotally mounted on which said drum is journaled, a valve connected to the arm and adapted to be opened and closed thereby, an electromagnet carried by the arm, a stop arm carried by the drum, a latch adapted to be moved into and out of the path of said stop arm by the electromagnet, and a device adapted to open and close the circuit of said electromagnet.

In testimony whereof I affix my signature in presence of two witnesses.

CHARLES JOSEPH MACKEREY.

Witnesses:
 CHARLES W. ISAACSON,
 RICHARD HAND.